US012763449B2

(12) United States Patent
Grandjean et al.

(10) Patent No.: US 12,763,449 B2
(45) Date of Patent: Oct. 13, 2026

(54) TRANSITION BETWEEN A CENTRAL CONTACT OF A COAXIAL COMPONENT AND A TRANSMISSION LINE, IN PARTICULAR A RADIO-FREQUENCY TRANSMISSION LINE

(71) Applicant: RADIALL SA, Aubervilliers (FR)

(72) Inventors: Fleury Grandjean, Culin (FR); Youssef Dahmani, Voreppe (FR)

(73) Assignee: RADIALL SA, Aubervilliers (FR)

(*) Notice: Subject to any disclaimer, the term of this patent is extended or adjusted under 35 U.S.C. 154(b) by 167 days.

(21) Appl. No.: 18/605,608

(22) Filed: Mar. 14, 2024

(65) Prior Publication Data

US 2024/0347888 A1 Oct. 17, 2024

(30) Foreign Application Priority Data

Mar. 16, 2023 (FR) ....................................... 2302445

(51) Int. Cl.
*H01P 5/08* (2006.01)
*H01P 1/22* (2006.01)

(52) U.S. Cl.
CPC .............. *H01P 5/085* (2013.01); *H01P 1/225* (2013.01)

(58) Field of Classification Search
CPC .. H01P 5/085; H01P 5/08; H01P 1/225; H01P 1/227; H01P 1/22; H01P 1/16; H01R 4/02; H01R 12/707; H01R 43/02; H01R 43/0256
USPC ........................................... 333/360, 254, 33
See application file for complete search history.

(56) References Cited

U.S. PATENT DOCUMENTS

| | | | | |
|---|---|---|---|---|
| 4,656,441 | A * | 4/1987 | Takahashi | H01P 5/085 333/260 |
| 5,402,088 | A * | 3/1995 | Pierro | H01P 5/085 333/260 |
| 2006/0097817 | A1 | 5/2006 | Blavette | |
| 2007/0159267 | A1 | 7/2007 | Nishimura | |
| 2009/0009272 | A1 | 1/2009 | Le Nadan | |
| 2010/0176896 | A1* | 7/2010 | Payne | H01R 24/50 333/260 |

OTHER PUBLICATIONS

Levy R: "New coaxial-to-stripline transformers using rectangular lines", vol. MTT-9, No. 3, May 1, 1961.
International Search Report dated Sep. 25, 2023.

* cited by examiner

*Primary Examiner* — Stephen E. Jones
(74) *Attorney, Agent, or Firm* — IPSILON USA, LLP

(57) ABSTRACT

An improved transition between a central contact of a coaxial component and a transmission line, such as a radio-frequency transmission line, is provided. The transition may be between a central contact of a coaxial component and a transmission line of a circuit such as a radio-frequency circuit. The central contact has a cylindrical front portion and, extending its front portion, a rear portion that makes contact with the transmission line and that is fastened thereto by a solder joint. The rear portion has at least one gap, defining a volume forming a reserve for the solder of the solder joint.

15 Claims, 15 Drawing Sheets

TRANSITION BETWEEN A CENTRAL CONTACT OF A COAXIAL COMPONENT AND A TRANSMISSION LINE, IN PARTICULAR A RADIO-FREQUENCY TRANSMISSION LINE

RELATED APPLICATION

This application claims the benefit of priority from French Patent Application No. 23 02445, filed on Mar. 16, 2023, the entirety of which is incorporated by reference.

TECHNICAL FIELD

The present invention relates to the field of circuits potentially having operating frequencies in a wide band, ranging from direct current (DC) to radio frequencies.

It more particularly relates to a transition between a central contact of a radio-frequency (RF) coaxial component and an RF transmission line.

In the context of the invention, the term "transition" must be understood to mean a passive link making it possible to pass from a coaxial medium for propagating a signal in a wide band ranging from DC to radio frequencies, to another non-coaxial medium. By radio frequency, what is meant is the conventional meaning, namely an electromagnetic wave frequency located between 3 kHz and 300 GHz. The frequency band in question may be DC-67 GHz, DC-70 GHz, DC-100 GHz or beyond.

The aim of the invention is to improve such a transition, in particular for central contacts of very small diameters and for transmission lines of very small dimensions.

Typically, it may be a question of a central contact of outside diameter smaller than 0.8 mm.

Typically, the transmission line propagates the electromagnetic wave in a TEM mode (TEM being the acronym of transverse electromagnetic).

Although more particularly described with reference to an application between a coaxial line and a planar line, the invention applies to any passive or active device making central contact with a coaxial, and in particular RF, component, such as an attenuator, divider, combiner, load or coupler, and to any circuit comprising a transmission line, such as a stripline, microstrip, coplanar line or suspended line.

A stripline is a transmission line surrounded by a dielectric and suspended between two ground planes on the internal layer or layers of a printed circuit board (PCB).

A microstrip line is a transmission line routed over an external layer of a printed circuit board and insulated from a ground plane by a dielectric.

A coplanar line is a transmission line on a dielectric, the line being formed by a conductive track flanked on each side by a conductive return line.

A suspended line is a transmission line routed over an external layer of a printed circuit board, all thereof being surrounded by a layer of air on each side of the circuit. Each layer of air is itself covered by an exterior ground plane.

DESCRIPTION OF RELATED ART

In the field of transmission of radio-frequency (RF) signals, it is known to use attenuators and loads employing a coaxial central contact and transmission lines taking the form of a planar line.

It will be recalled here that an attenuator serves to lower the power of an RF signal, in particular to protect electronic equipment, while the primary function of a load is to absorb an RF signal and dissipate it in the form of heat.

Currently, coaxial loads and attenuators use circuits that have a ceramic substrate, such as a substrate made of $Al_2O_3$, AlN or quartz.

FIGS. 1 and 1A show a transition, generally designated by the reference number 1, such as currently employed in an existing RF coaxial attenuator.

The transition 1 between a central contact 2 taking the form of a cylindrical pin in its front portion and a strip line 30 of the circuit 3 comprises a solder joint B. More precisely, the central contact 2 comprises a semicylindrical rear portion bounded by a flat 20 that is soldered by means of the solder joint B to the strip line 30.

Next, these components connected by the transition 1 thus formed are secured to a component, called the cartridge 4, by means of another solder joint to conductive lines 31 on the periphery of the dielectric carrier 32 of the circuit 3. These soldered lines 31 suspend the circuit 3 in the ground conductor formed by the cartridge 4.

The attenuator moreover comprises another central contact taking the form of a socket 5 in which the pin 2 is connected, and a spacer 6 around these two central contacts 2, 5.

For many applications, it is sought to design attenuators and loads which make it possible to transmit signals at an increasingly high frequency, in particular up to 67 GHz or even beyond.

This increase in frequency implies a decrease in the diameters (which are typically smaller than 0.8 mm) of the central contacts and in the dimensions of the transmission lines of the circuits, this having a greater relative impact on the volumes and associated amounts of solder in the solder joints, with various related drawbacks with which the inventors may have been confronted.

First, transitions 1 such as those shown in FIG. 1 require substantial control of the solder joint B, and in particular of the amount of solder that it contains, because this parameter strongly influences frequency response, i.e. the RF parameters of the attenuator or the load as a function of the frequency of the transmitted signal.

Specifically, variations in the amount of solder in the solder joint B generate a geometric variation around the rear portion of the central contact 2 coated with the solder B, this resulting in a substantial variation in the RF performance of the attenuator. This is illustrated in FIGS. 2 to 3B, in which FIGS. 2 to 2B show a first solder joint B of different volume and shape from the second solder joint B shown in FIGS. 3 to 3B.

The limitations of current technologies make it difficult, if not impossible, to control the amount of solder sufficiently to make its influence on frequency response negligible.

Furthermore, the axial position in the cartridge 4 of the transmission line 30 soldered to the central contact 2 is difficult to control to a very high degree of precision. Thus, variations in electrical impedance (variations in match) related to machining tolerances and to the relative positions of the parts, and which make it possible to optimize standing wave ratio (SWR), cannot be precisely controlled. This gives rise to large dispersions, resulting in large variations in electrical performance. This effect is even more predominant at high frequency.

More precisely, the relative position of the central contact 2 with respect to the edge of the dielectric substrate 32 of the circuit 3 cannot be precisely controlled, because of the method used to dice the substrates. Specifically, the circuits are diced by scoring then breakage between the various circuits of a given dielectric substrate wafer. However, a break has an irregular profile, this de facto meaning that the central contact 2 cannot be positioned with respect to the circuit 3 in a way that is reproducible both in terms of distance and angle. This is illustrated in FIGS. 4A and 4B, which show two different configurations of the relative position of the central contact 2 with respect to the circuit 3, namely one without a space between the lateral edge of the circuit 3 and the central contact 2, and one with a space E therebetween, respectively.

These defects in the position of the central contact lead to variations in the characteristic impedance of the RF line comprising the transmission line 30 and the central contact 2, this decreasing signal transmission performance, especially at very high frequency.

Lastly, the decrease in the size of the parts of the attenuator, which as mentioned above is necessary as a result of the increase in frequency, leads to a decrease in the size of the contact regions intended to receive the solder joints and therefore to a decrease in the amount of solder in these joints B. The decrease in the size of these regions, and therefore in the surface areas facing the soldered parts, lead to a decrease in their mechanical strength.

OBJECTS AND SUMMARY

There is therefore a need to improve transitions, in particular radio-frequency (RF) transitions, between a central contact of a coaxial component and a transmission line, in particular in order to overcome the aforementioned drawbacks.

The invention aims to meet this need fully or in part.

To this end, one subject of the invention, according to one of its aspects, is a transition between a central contact of a coaxial component and a transmission line of a circuit, in particular a radio-frequency circuit, the central contact comprising a cylindrical front portion and, extending its front portion, a rear portion that makes contact with the transmission line and that is fastened thereto by a solder joint, the rear portion comprising at least one gap, defining a volume forming a reserve for the solder of the solder joint.

According to one advantageous embodiment, the flat rear portion incorporating the gap is bounded by two plane and parallel faces.

According to one advantageous embodiment, the rear portion is a right parallelepiped or a shape of trapezoidal cross section.

Preferably, the height between the two plane and parallel faces being between 0.1 and 0.3 mm, and preferably between 0.13 and 0.18 mm.

Advantageously, the gap is open heightwise.

According to one advantageous variant of embodiment, the gap further opens onto at least one free end of the rear portion of the central contact.

According to one advantageous variant of embodiment, the open gap is at least partially cylindrical or parallelepipedal in shape.

Preferably, the cylindrical front portion being away from the circuit.

Advantageously, the distance between the cylindrical portion of the central contact and the facing edge of the circuit is between 0.1 and 0.8 mm, and preferably between 0.35 and 0.45 mm.

A plurality of advantageous configurations may be envisioned:

- the circuit may be of suspended-microstrip type and comprising a dielectric substrate a major face of which comprises the transmission line, which takes the form of a microstrip, and conductive ground lines intended to be soldered to a part of the coaxial component, so as to suspend the circuit in a ground conductor formed by said part;
- the circuit may be of coplanar type and comprise a dielectric substrate a major face of which comprises the transmission line, which takes the form of a strip, inserted into a coplanar ground plane at a distance S from the strip.

The transition according to the invention is advantageously configured to operate from DC to 100 GHz and preferably from DC to 70 GHz, DC being the acronym of direct current.

The invention also relates to a passive or active electronic, in particular radio-frequency, device comprising at least one transition such as described above.

A passive electronic device forming a coaxial component selected from an attenuator, a divider, a coupler, a combiner, and a load.

According to one advantageous embodiment, the device according to the invention, in particular when it is an attenuator, comprises a cartridge that forms part of the coaxial component and that is bounded by a sidewall comprising at least one electrically conductive region within which the circuit is fastened, at least one of the conductive ground lines being connected to said electrically conductive region by at least one electrical connection ensured by a solder joint, said sidewall being passed through by a through-hole that extends right through the thickness of said sidewall and that provides direct access to the electrical connection with a view to making or inspecting said electrical connection therein.

The one or more access ports in the side wall of the cartridge allow access to the zone of the electrical connection to be facilitated, with a view to making or inspecting the latter, this being particularly advantageous when a high-quality electrical contact between the component and the cartridge must be guaranteed.

Thus, the invention essentially consists of a transition between a central contact of a coaxial component and a transmission line of a circuit, in particular a radio-frequency circuit, with a central contact the rear portion of which comprises a gap defining a volume forming a solder reserve and that is positioned directly on the transmission line, in order to make the electrical contact. The central contact is connected to the transmission line by means of a solder joint.

The invention has many advantages over prior-art transitions, among which may be mentioned:

- less impact of the solder joint on the RF performance of the component incorporating the transition, because of the gap defining the solder reserve;
- better control of the shape of the solder joint securing the central contact to the transmission line, by virtue of the flat shape of the rear portion of the central contact of plane and parallel faces; this decreasing variations in performance with respect to the transmitted, in particular RF, signal;
- a better mechanical strength of the transition through the possible increase in the length of the edges of contact between the rear portion of the central contact and the transmission line, through the presence of the open gap;
- a decrease in the effect of the position of the central contact relative to the circuit bearing the transmission line, because of the length of the flat rear portion of the central contact which may be adjusted to move the cylindrical portion away from the latter.

BRIEF DESCRIPTION OF THE DRAWINGS

Other advantages and features of the invention will become more clearly apparent on reading the detailed description of examples of implementation of the invention, given by way of non-limiting illustration with reference to the following figures.

DETAILED DESCRIPTION

Throughout the present patent application, the terms “front” and “rear” are to be understood with respect to a coaxial component employing at least one transition between a central contact and a transmission line of a circuit according to the invention. Thus, the front portion of a central contact is the portion intended to be coupled with another central contact.

For the sake of clarity, the same reference number has been used for the same element of a transition according to the prior art and of a transition according to the invention.

FIGS. 1 to 4B have already been described in detail in the preamble. They will therefore not be commented on below.

Figure 5:
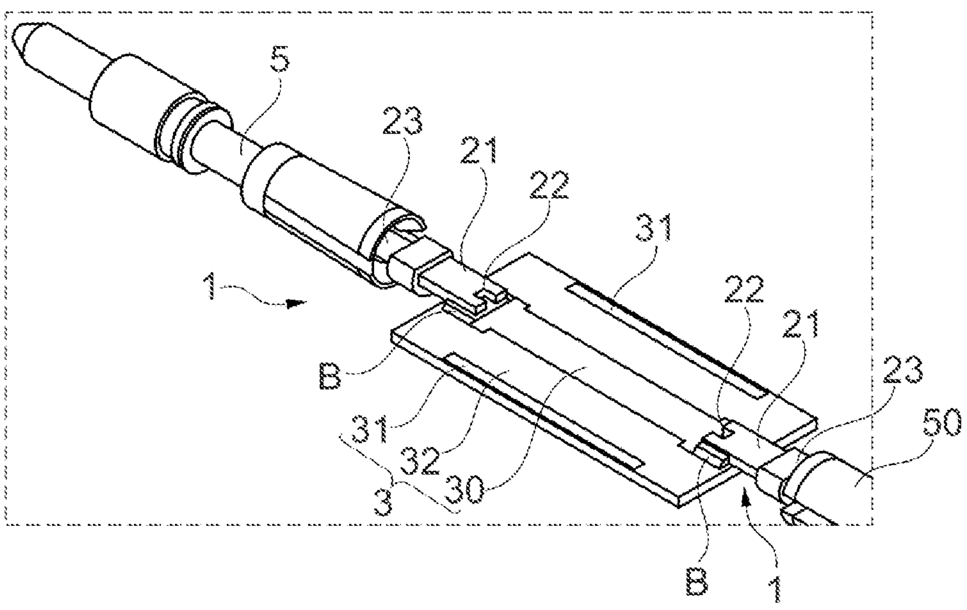
FIG. 5 is a partial perspective view of one portion of a coaxial attenuator with two transitions between a central contact and RF transmission line, according to the invention.
Figure 5A:
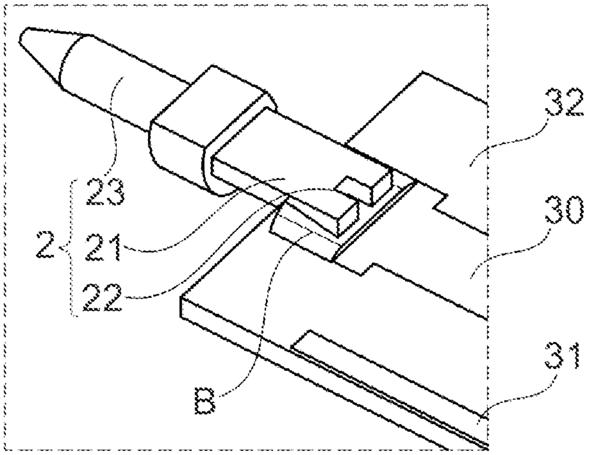
FIG. 5A is a detail of FIG. 5.

FIGS. 5 and 5A show one portion of a coaxial RF attenuator with two transitions according to the invention.

Each transition 1 between a central contact 2 taking the form of a cylindrical pin in its front portion and a suspended microstrip line 30 of an RF circuit 3 comprises a solder joint B.

More precisely, according to the invention, the central contact 2 comprises a flat rear portion 21, which takes the form of a right parallelepiped, and which is soldered by means of the solder joint B to the line 30, which takes the form of a suspended microstrip. The edges of the flat portion 21 may be cylindrical.

The flat portion 21 is positioned directly on the RF line, in order to make the electrical contact, and connection of the contact to the line 30 is completed by the solder joint B.

The circuit 3 is of suspended micro-strip type: it thus comprises a dielectric substrate 32 one major face of which bears both the transmission line 30 and two conductive ground lines 31 that extend, peripherally, each along one longitudinal edge of the substrate 32.

The method for producing a transition 1 according to the invention consists in the following steps:

- i/ depositing some solder B on the transmission line 30 at the edge of the circuit 3,
- ii/ placing the central contact 2 with its flat rear portion 21 on the solder B at the edge of the circuit 3,
- iii/ baking in an oven to produce the solder joint and thus form the transition 1.

Figure 6:
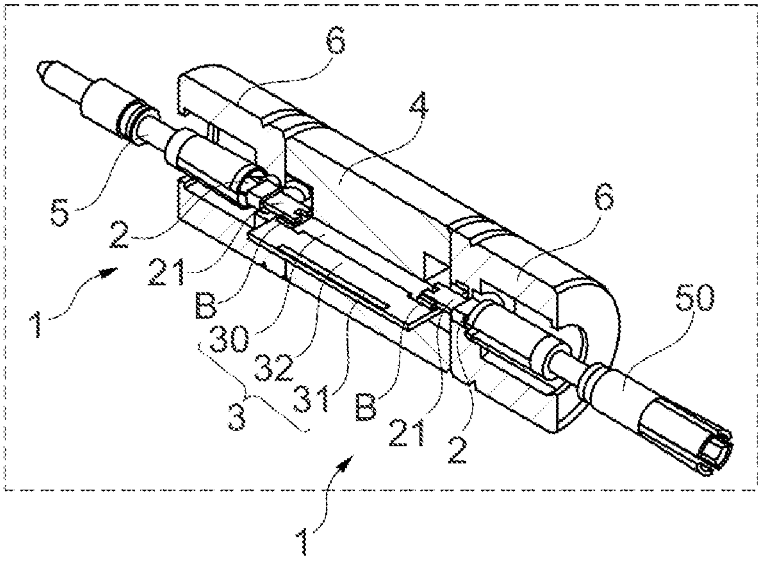
FIG. 6 is analogous to FIG. 5 but in addition shows, seen in longitudinal cross section, the cartridge and spacers arranged coaxially around the transitions according to the invention.

Next, as shown in FIG. 6, these components connected by the transition 1 thus formed are secured to a component, called the cartridge 4, for example by means of another solder joint to the conductive lines 31 on the periphery of the dielectric carrier 32 of the circuit 3. These ground lines 31 are intended to be soldered to a cartridge 4 of the coaxial attenuator, so as to suspend the circuit 3 in a ground conductor formed by the cartridge 4.

The attenuator moreover comprises another central contact taking the form of a male socket 5 at its free end, in which the pin 2 of one of the two central contacts 2 is connected, and a spacer 6 around at least one segment of the central contact 2 and of the socket 5.

The pin 2 of the other of the two central contacts is connected to a female socket 50 at its free end, a spacer 6 also surrounding at least one segment of the pin 2 and of the socket 50.

Figure 7:
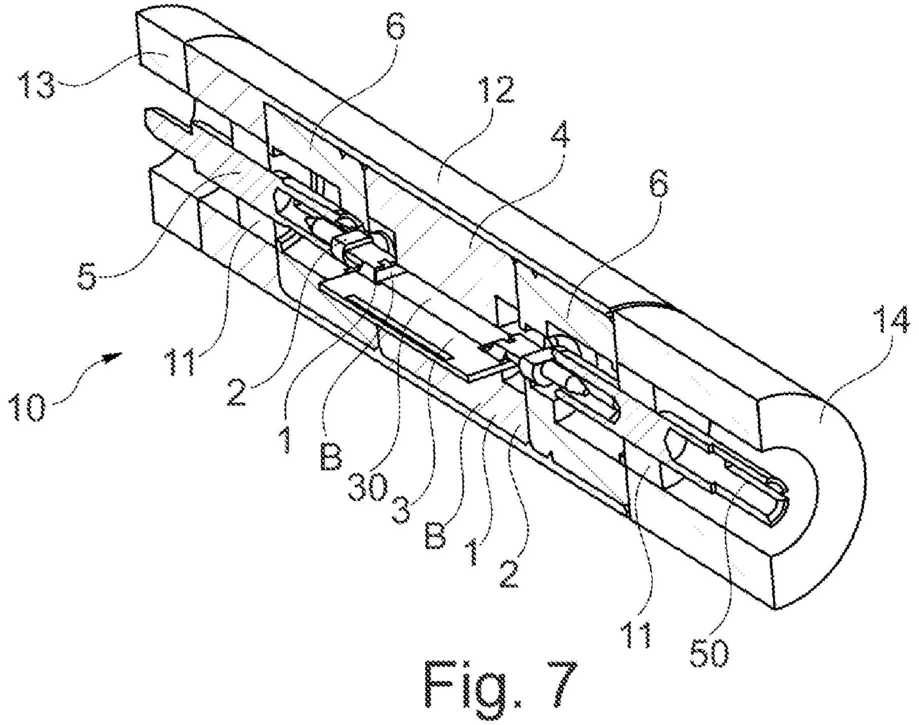
FIG. 7 is a longitudinal cross-sectional view of a coaxial attenuator in its entirety with two transitions as shown in FIGS. 5 and 6.

Such as illustrated in FIG. 7, the coaxial attenuator 10 further comprises two insulators 11. One of the insulators 11 is interposed between the pin 5 and a ground body 12 that is aligned with a first metal fastening body 13. The other of the insulators 11 is interposed between the socket 50 and a second metal fastening body 14.

Preferably, the rear portion 21 of the central contact 2 has an open gap 22 that passes right through this rear portion 21.

Figure 8A:
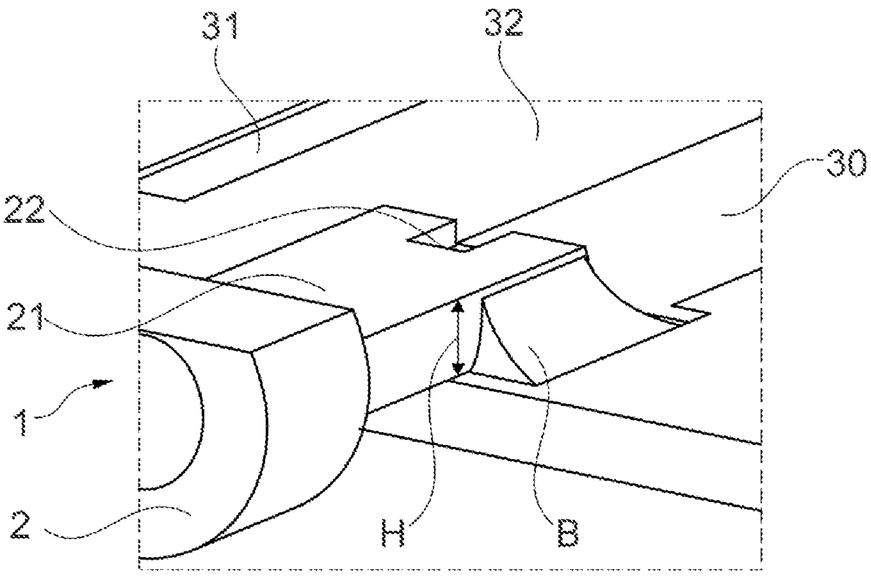
FIGS. 8A and 8B are partial perspective views of a transition according to the invention.
Figure 8B:
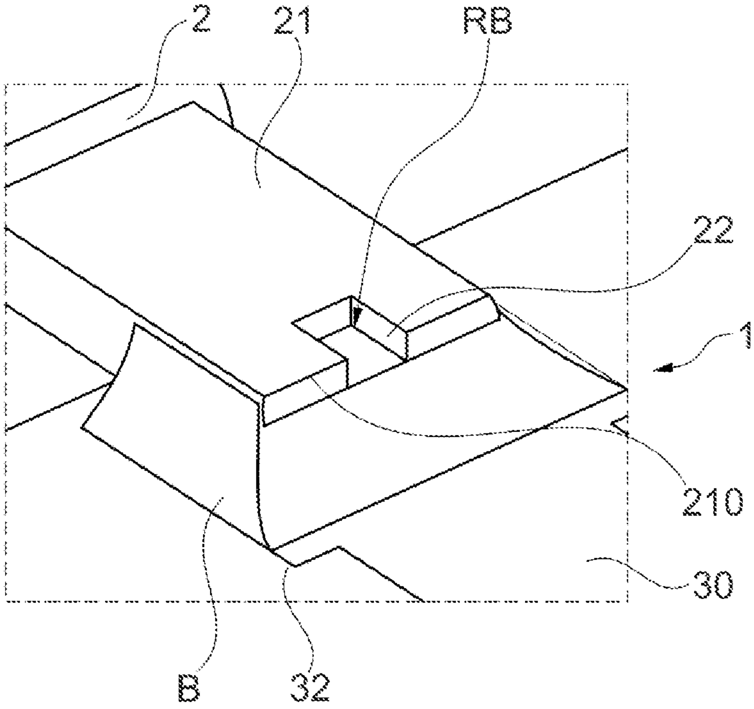

In the example illustrated in FIGS. 8A and 8B, this open gap 22 further opens onto the free end of the rear portion 21 and takes the form of a right parallelepipedal groove.

FIGS. 8A and 8B illustrate one of the advantages of a transition 1 according to the invention.

Figure 1:
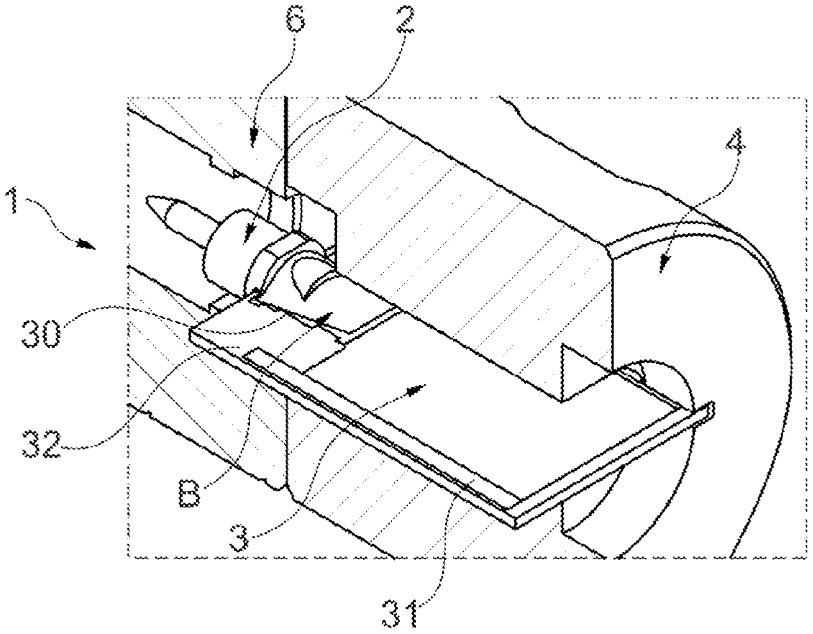
Fig. 1 (PRIOR ART)
FIG. 1 shows a partial longitudinal cross-sectional view in perspective of one portion of a coaxial load with a transition between a central contact and an RF transmission line, according to the prior art.
Figure 1A:
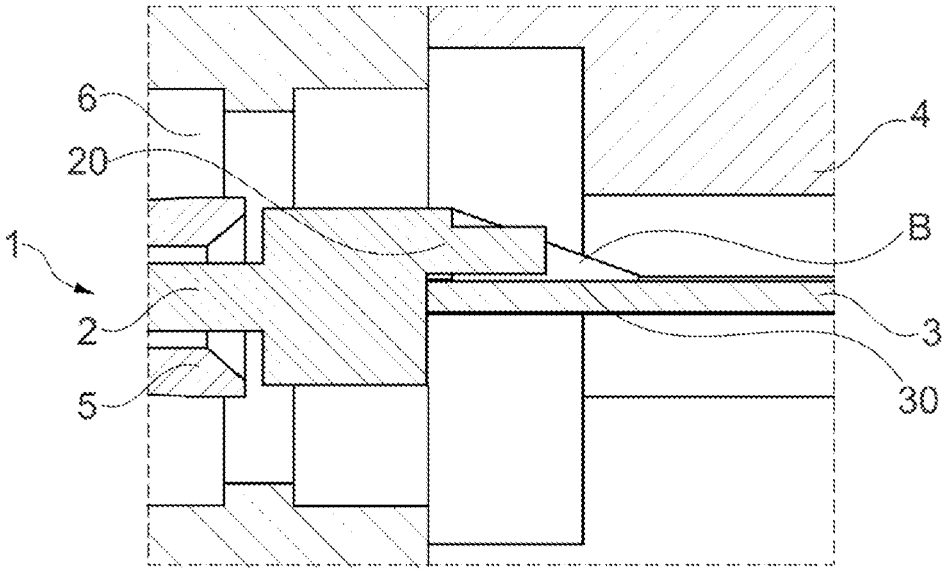
Fig. 1A (PRIOR ART)
FIG. 1A is a partial longitudinal cross-sectional view of FIG. 1.
Figure 2:
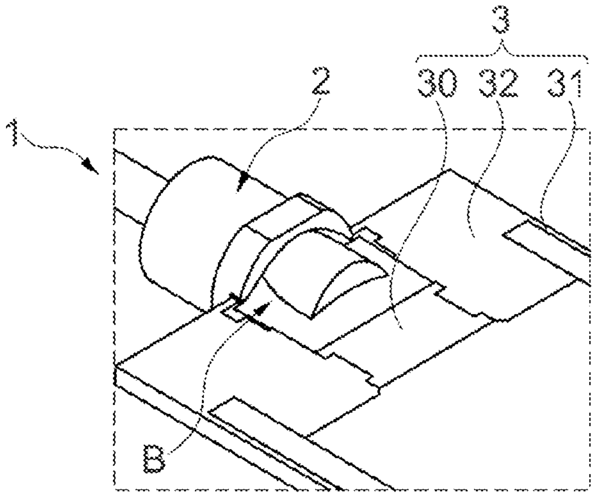
Fig. 2 (PRIOR ART)
FIGS. 2, 2A and 2B are perspective, longitudinal cross-sectional and rear views of a transition according to the prior art with a first solder joint.
Figure 2A:
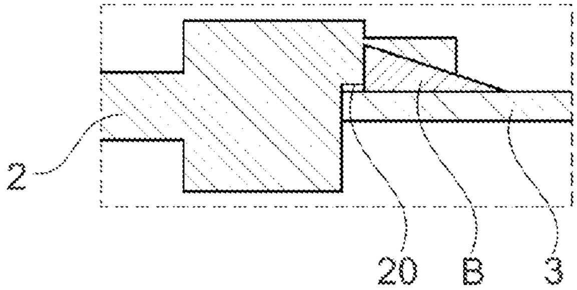
Fig. 2A (PRIOR ART)
Figure 2B:
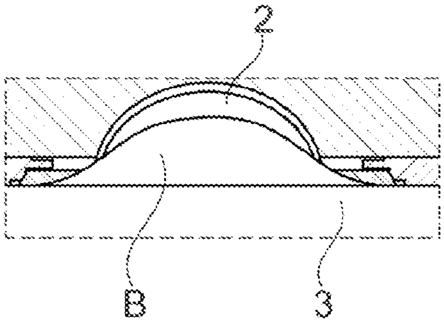
Fig. 2B (PRIOR ART)
Figure 3:
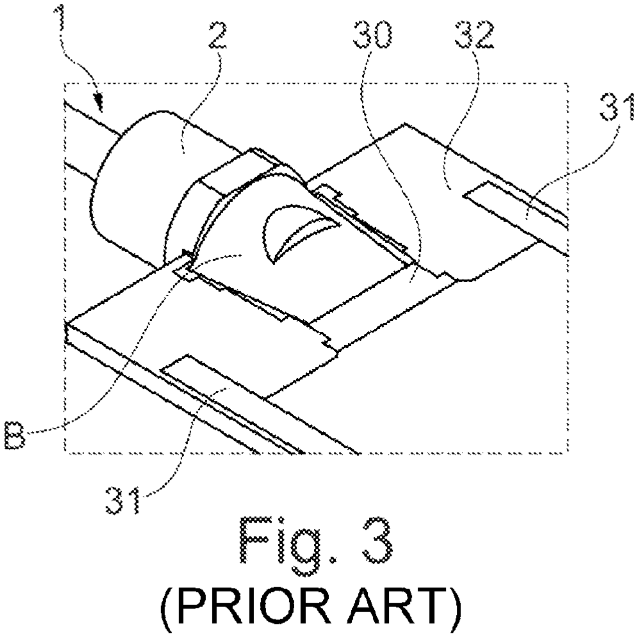
Fig. 3 (PRIOR ART)
FIGS. 3, 3A and 3B are perspective, longitudinal cross-sectional and rear views of a transition according to the prior art with a second solder joint different from the first solder joint, resulting from imperfect control of the solder joint.
Figure 3A:
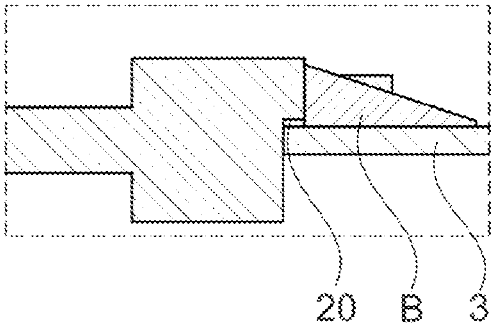
Fig. 3A (PRIOR ART)
Figure 3B:
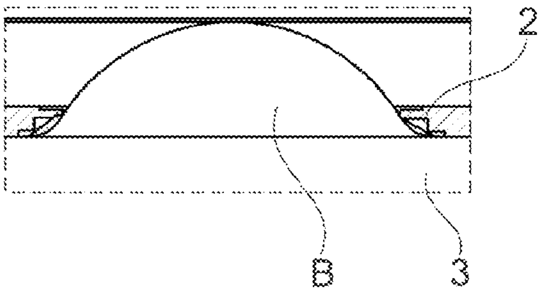
Fig. 3B (PRIOR ART)
Figure 4A:
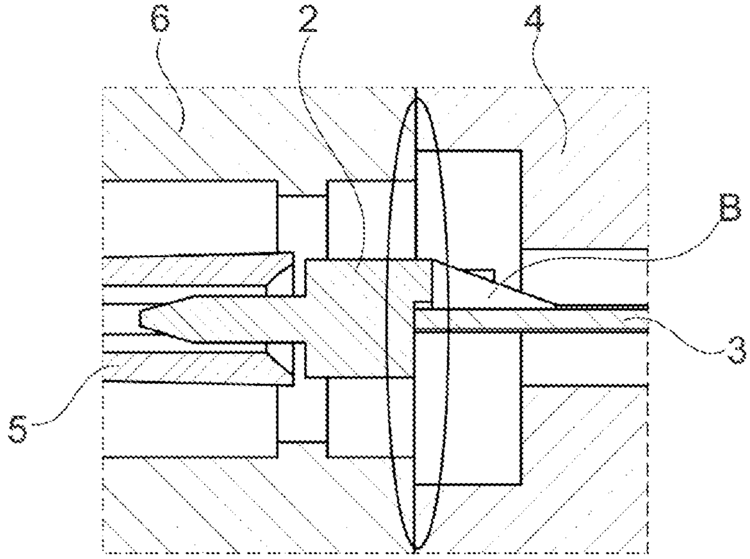
Fig. 4A (PRIOR ART)
FIGS. 4A and 4B are partial longitudinal cross-sectional views of a portion of a coaxial attenuator with a transition between a central contact and an RF transmission line, according to the prior art, showing two different configurations of the relative position between the components, resulting from imperfect control of the position of the rear portion of the central contact in the circuit.
Figure 4B:
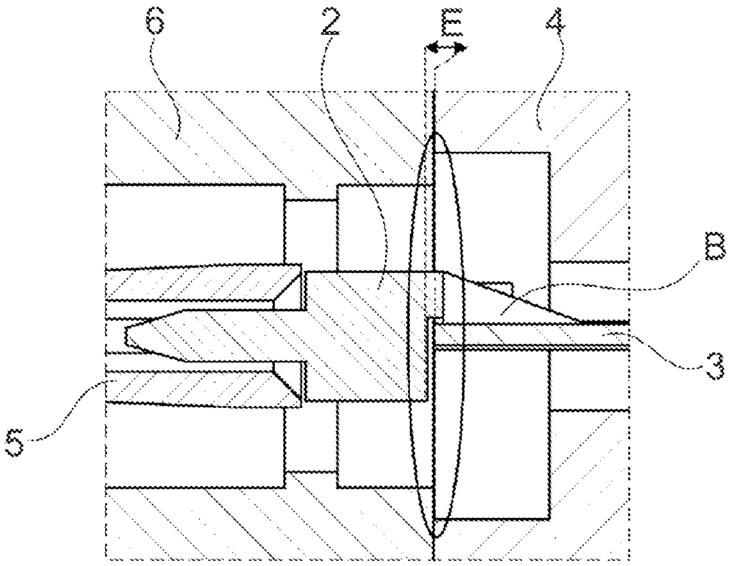
Fig. 4B (PRIOR ART)

As may be seen, the fact of having a flat shape 21 limits the rise of the solder joint B along the height of this rear portion 21 of the central contact. The existence of a sharp edge at the intersection 210 of the upper flat face and of the free edge stops propagation of the solder over the height of the rear portion of the central contact. Indeed, the solder joint B will generally be limited to the height H of the flat, which is preferably about 0.1 to 0.3 mm, and more preferably about 0.13 to 0.18 mm. Variations in the height of the solder joint B are limited. Thus, better control of the shape of the meniscus of the solder joint B is obtained than in the case of a hemicylindrical rear portion with a flat 20 as shown in FIGS. 2 to 3B. This reduces variations in RF performance from one transition 1 to another. In other words, by virtue of the flat portion 21 of the central contact 2, reproducibility is obtained in RF performance from one coaxial attenuator 10 to another when they are produced using the same method.

The open gap 22 further makes it possible to provide a volume that serves as a reserve RB for the solder. This reserve may therefore be filled to a greater or lesser extent when the central contact 2 is placed on the solder. The level to which this reserve is filled has no effect on the RF performance of the coaxial attenuator 10. Indeed, this reserve RB, by absorbing excess solder B to a greater or lesser extent, makes it possible to greatly limit the impact of the amount of solder on the performance of the attenuator 10.

Figure 9:
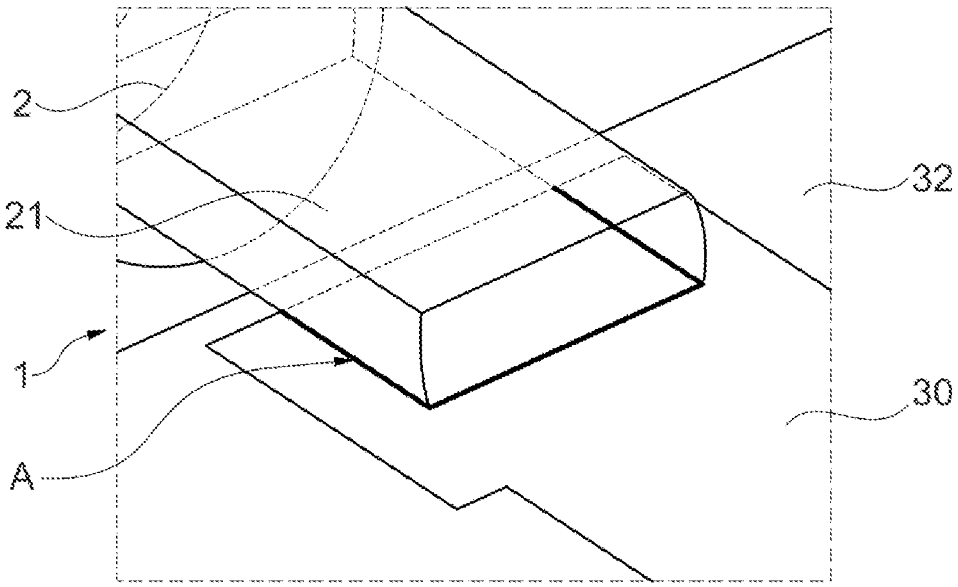
FIG. 9 is a partial perspective view illustrating the contact edge between the rear portion of a central contact devoid of gap and a transmission line for production of a soldered transition.

Moreover, the flat portion 21 makes it possible to obtain a good mechanical strength. The value of this strength is proportional to the length of the peripheral edges A of contact between this portion 21 and the transmission line 30, as shown in FIG. 9.

Figure 10:
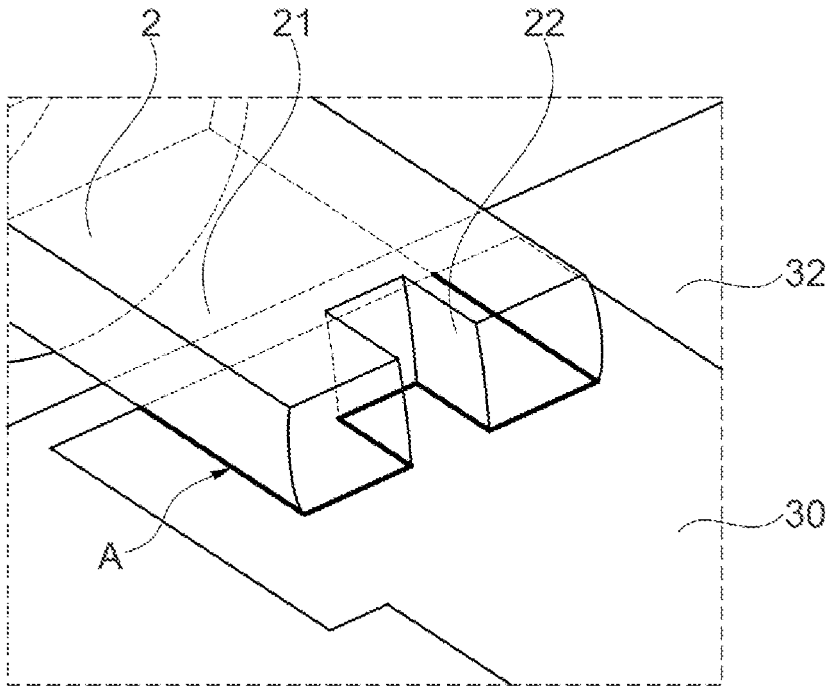
FIG. 10 is a partial perspective view illustrating the contact edge between the flat rear portion of a central contact with an open gap and a transmission line for production of a soldered transition according to the invention.

As shown in FIG. 10, the open groove 22 allows the length of contact A to be increased and therefore the mechanical strength of the central contact 2 to the circuit 3 to be increased.

Figure 11:
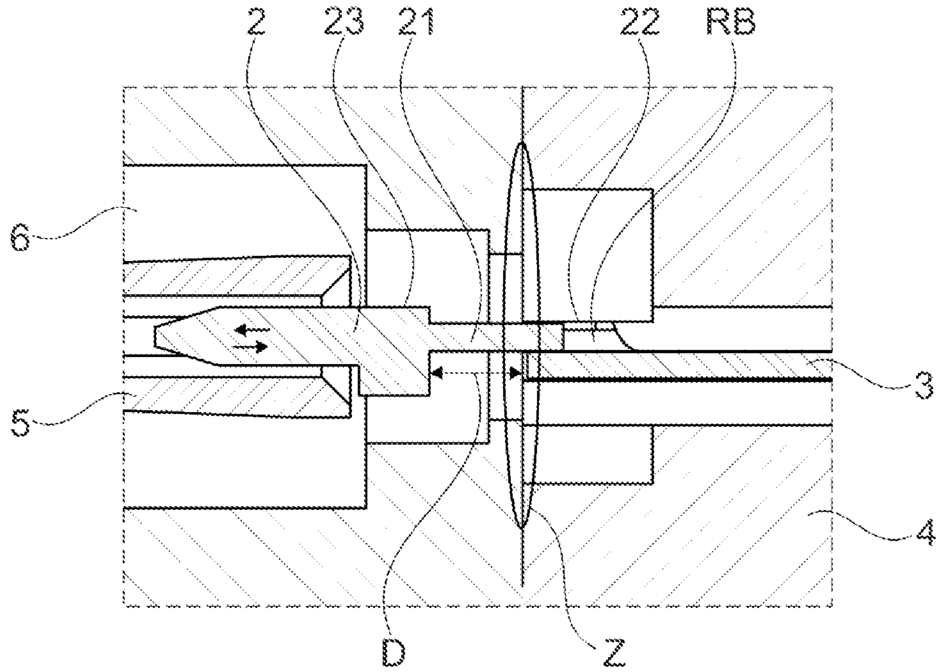
FIG. 11 illustrates a partial longitudinal cross-sectional view of one portion of a coaxial attenuator with a transition according to the invention, showing a configuration of the relative position between the components.

Another advantage obtained by a transition 1 according to the invention is illustrated in FIG. 11. The flat portion 21 of the central contact 2 extends beyond the circuit 3, this making it possible to guarantee separation, or in other words an offset D, of the cylindrical portion 23 from the central contact 2 of the circuit 3. The offset is induced by a position of the central contact 2 relative to the edge of the circuit 3, the distance D of which may vary. Preferably, the offset between the circuit edge and the cylindrical contact portion 23 is between 0.1 and 0.8 mm, and preferably between 0.35 and 0.45 mm.

This offset thus makes it possible to make the transition 1 less sensitive to defects in the position both of the central contact 2 relative to the edge of the circuit 3 and of the sub-assembly consisting of the circuit 3 and of the central contact 2 secured by the transition 1 relative to the cartridge 4 of the attenuator 10. It also makes it possible to dispense with levels of finishing of the edges of the circuit 3.

The variation in electrical impedance in the zone Z at the free edge of the circuit 3 is therefore not influenced by the relative position of the central contact with respect to the edge of the circuit 3, as symbolized by the encircled region in FIG. 11. This makes it possible to decrease the influence of the position of the central contact 2 on the RF performance of the attenuator 10.

The inventors have simulated the standing wave ratio (SWR) as a function of frequency, for a coaxial attenuator 10 incorporating two transitions 1 according to the invention, in comparison with a coaxial attenuator incorporating two transitions according to the prior art. The result of this simulation is shown in FIG. 12.

Figure 12:
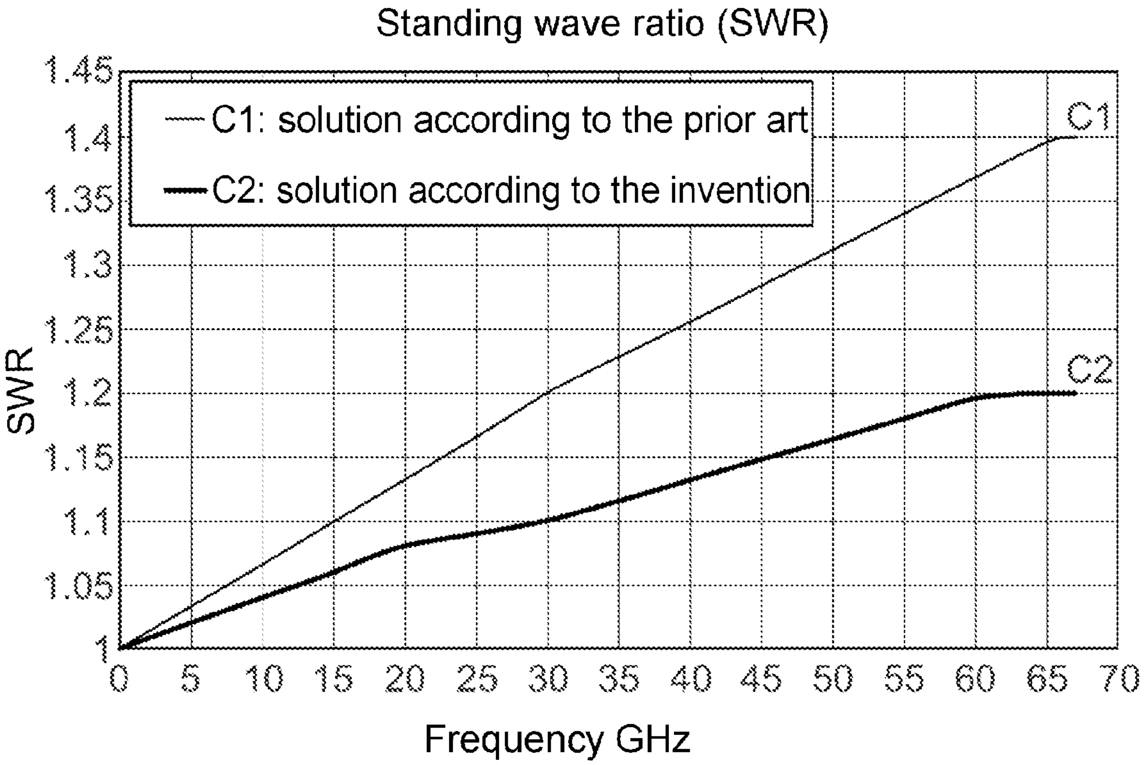
FIG. 12 illustrates, in curve form, a simulation of a standing wave ratio (SWR) as a function of frequency, such as obtained with a transition according to the prior art and according to the invention.

FIG. 12 shows two curves C1 and C2. Curve C1 shows the standing wave ratio for a coaxial attenuator comprising two transitions according to the prior art, namely, for example, with a central contact with a semi-cylindrical flat-comprising rear portion. Curve C2 shows the standing wave ratio for a coaxial attenuator comprising two transitions according to the invention. Curve C2 shows an improvement in the RF performance of the attenuator, over the frequency range DC-70 GHz, since, for a given frequency, the standing wave ratio of C2 is lower than the standing wave ratio of C1 and approaches the value 1.

Figure 13:
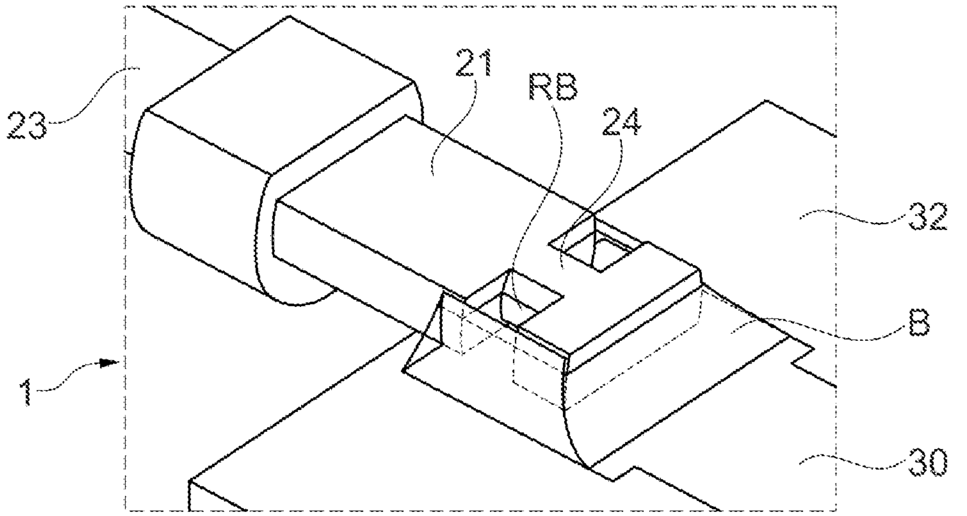
FIGS. 13, 14 and 15 illustrate, in partial perspective, a transition according to the invention with various variants of embodiment of the open gap in the rear portion of a central contact.
Figure 14:
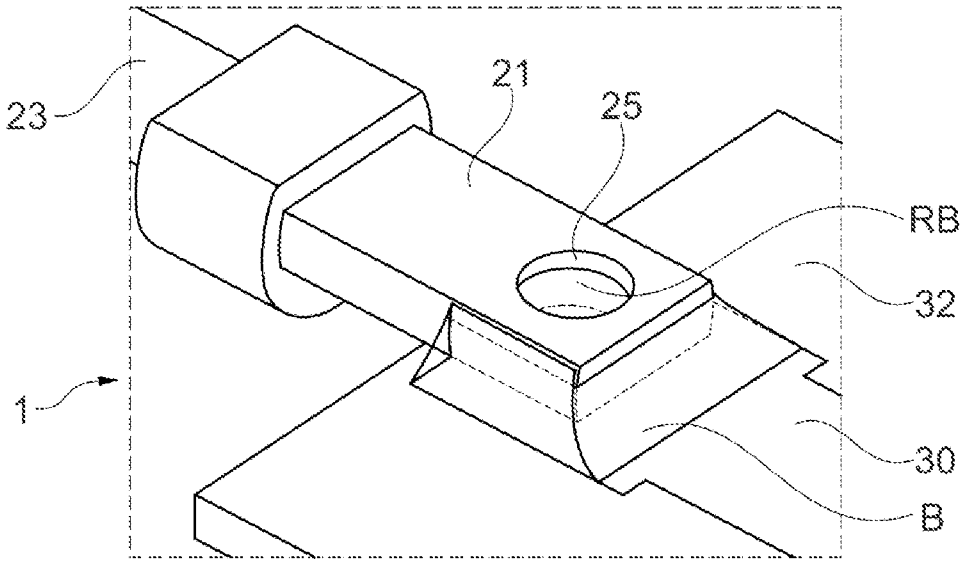
Figure 15:
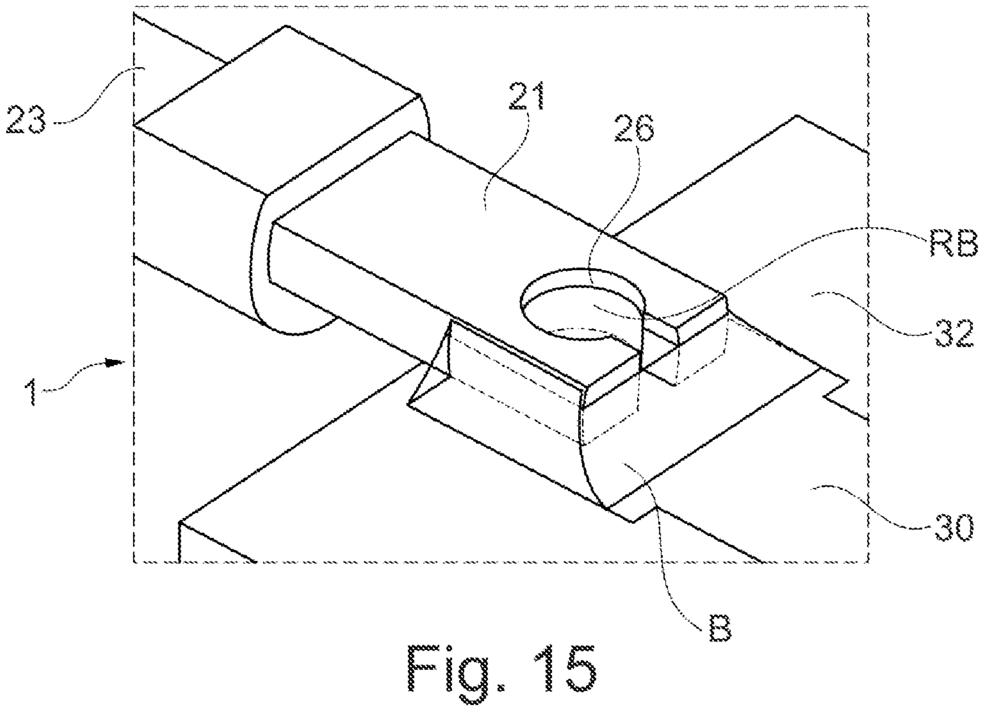

Various variants of the form of the open gap have been illustrated in FIGS. 13 to 15, which show respectively:

- the free end 24 of a T-shaped rear portion 21 defining two open grooves on either side, each of substantially parallelepipedal shape,
- an open groove 25 taking the form of a hollow cylinder within the rear portion 21,
- an open groove 26 taking the form of a hollow cylinder opening onto the transmission line 30 via an extension of right-parallelepipedal shape.

The coaxial attenuator 10 such as described above employs a circuit 3 of suspended-microstrip type.

Other circuit variants may be employed within the scope of the invention.

Figure 16:
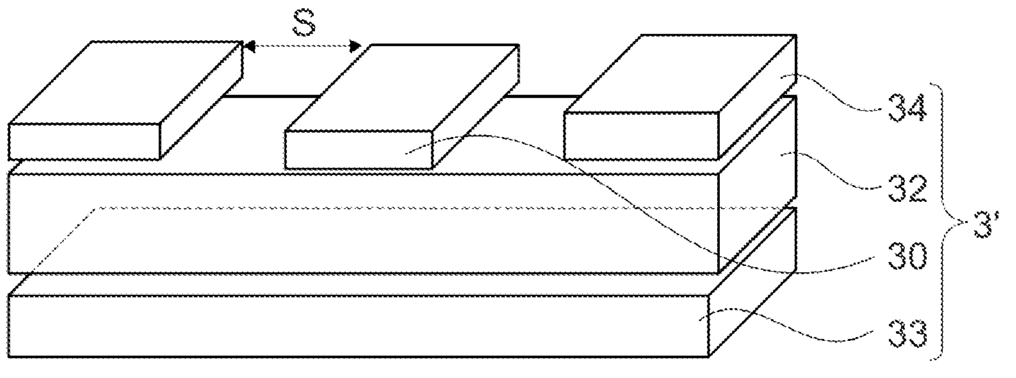
FIG. 16 is a transverse cross-sectional view of a coplanar line according to a first variant of the circuit according to the invention.

FIG. 16 shows a circuit 3' of coplanar type in which a transition 1 according to the invention may be produced. This circuit 3' thus comprises a dielectric substrate 32 a major face of which comprises the transmission line 30, which takes the form of a strip, inserted into a coplanar ground plane 34 at a distance S from the strip. The other major face opposite that of the transmission line 30 comprises a ground plane 33.

Figure 17:
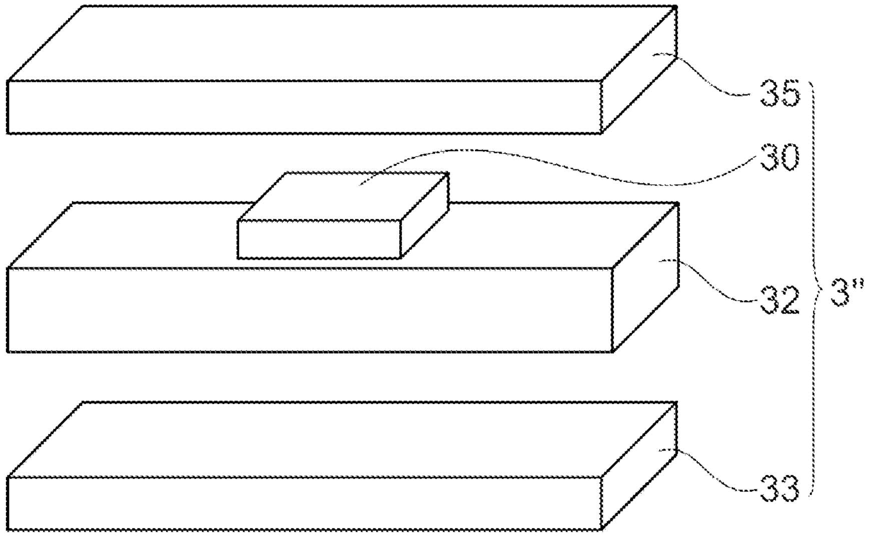
FIG. 17 is a transverse cross-sectional view of a suspended microstrip line, according to a second variant of the circuit according to the invention.

FIG. 17 shows a circuit 3" of suspended-microstrip type in which a transition 1 according to the invention may be produced. Specifically, the circuit 3" comprises a dielectric substrate 32 a major face of which comprises the transmission line 30, which takes the form of a strip, and which is inserted between two ground planes 33, 35.

Figure 18:
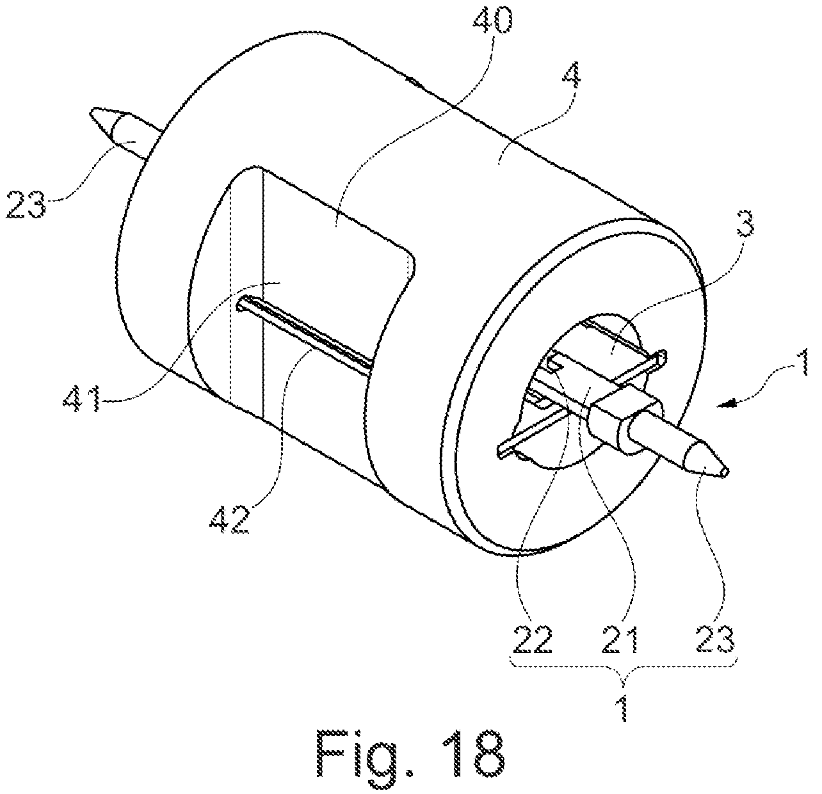
FIG. 18 illustrates in perspective one advantageous variant of embodiment of a cartridge of a coaxial attenuator with at least one transition according to the invention.

FIG. 18 shows one advantageous variant of embodiment of a cartridge 4 that incorporates at least one transition 1 according to the invention within it. Here, at least one side wall 40 comprises a through-hole 41 that extends right through the thickness of the side wall 40 and that provides direct access to an electrical connection produced by soldering between one of the ground lines 31 of the circuit 3 of the transition and an electrically conductive region 42 of the side wall. This direct access thus makes it possible to make or inspect said electrical connection.

Other variants and improvements may be provided without however departing from the scope of the invention.

Although, in the illustrated examples, the rear portion 21 of the central contact 2 is a right parallelepiped, other shapes with parallel plane faces, one of which makes contact with the transmission line, may be envisioned.

Open gaps of shapes other than those illustrated may be envisioned.

The invention claimed is:

1. A transition between a central contact of a coaxial component and a transmission line of a circuit, the central contact comprising:

a cylindrical front portion and, extending from the front portion, a rear portion that makes contact with the transmission line and that is fastened thereto by a solder joint, the rear portion having at least one gap, defining a volume forming a reserve for the solder of the solder joint, configured to absorb excess solder.

2. The transition as claimed in claim 1, wherein the rear portion incorporating the gap is flat, and bounded by two plane faces.

3. The transition as claimed in claim 2, wherein the rear portion is a right parallelepiped or a shape of trapezoidal cross section.

4. The transition as claimed in claim 2, wherein the height between the two plane faces is between 0.1 and 0.3 mm.

5. The transition as claimed in claim 1, wherein the gap is open height wise.

6. The transition as claimed in claim 5, wherein the gap further opens onto at least one free end of the rear portion of the central contact.

7. The transition as claimed in claim 5, wherein the open gap is at least partially cylindrical or parallelepipedal in shape.

8. The transition as claimed in claim 1, wherein the cylindrical front portion of the central contact is away from the circuit.

9. The transition as claimed in claim 8, wherein a distance between the cylindrical portion of the central contact and a facing edge of the circuit is between 0.1 and 0.8 mm.

10. The transition as claimed in claim 1, wherein the circuit is a suspended-microstrip circuit and has a dielectric substrate, a major face of the dielectric substrate having the transmission line which takes the form of a microstrip, and conductive ground lines intended to be soldered to a part of the coaxial component, so as to suspend the circuit in a ground conductor formed by said part.

11. The transition as claimed in claim 1, wherein the circuit is a coplanar circuit and has a dielectric substrate, a major face of which has the transmission line, which takes the form of a strip, inserted into a coplanar ground plane at a distance from the strip.

12. The transition as claimed in claim 1, wherein said transition is configured to operate from DC to 100 GHz, DC being the acronym of direct current.

13. A passive or active electronic device comprising: at least one transition as claimed in claim 1.

14. The passive electronic device as claimed in claim 13, forming a coaxial component selected from an attenuator, a divider, a combiner, a coupler, and a load.

15. The electronic device as claimed in claim 14 comprising: a cartridge that forms part of the coaxial component and that is bounded by a sidewall comprising at least one electrically conductive region within which the circuit is fastened, at least one conductive ground line being connected to said electrically conductive region by at least one electrical connection ensured by a solder joint, said sidewall being passed through by a through-hole that extends right through the thickness of said sidewall and that provides direct access to the electrical connection allowing inspection of said electrical connection therein.

* * * * *